(12) United States Patent
Yen et al.

(10) Patent No.: US 7,916,905 B2
(45) Date of Patent: Mar. 29, 2011

(54) SYSTEM AND METHOD FOR IMAGE FACIAL AREA DETECTION EMPLOYING SKIN TONES

(75) Inventors: Jonathan Yen, San Jose, CA (US); Tony Quach, Anaheim, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 213 days.

(21) Appl. No.: 12/322,394

(22) Filed: Feb. 2, 2009

(65) Prior Publication Data

US 2010/0195911 A1 Aug. 5, 2010

(51) Int. Cl.
*G06K 9/00* (2006.01)
*G06K 9/46* (2006.01)
*G06K 9/66* (2006.01)

(52) U.S. Cl. ......... 382/118; 382/195; 382/217; 382/224

(58) Field of Classification Search .................. 382/118, 382/190, 195, 217–228
See application file for complete search history.

(56) References Cited

U.S. PATENT DOCUMENTS

| | | | |
|---|---|---|---|
| 6,263,113 B1 * | 7/2001 | Abdel-Mottaleb et al. ... | 382/237 |
| 6,574,354 B2 * | 6/2003 | Abdel-Mottaleb et al. ... | 382/118 |
| 6,690,822 B1 * | 2/2004 | Chen et al. ................... | 382/162 |
| 2005/0207643 A1 * | 9/2005 | Lee et al. ..................... | 382/165 |
| 2007/0031032 A1 * | 2/2007 | Oh et al. ....................... | 382/167 |
| 2007/0041640 A1 * | 2/2007 | Tabata et al. ................. | 382/173 |
| 2008/0212879 A1 * | 9/2008 | Torii et al. .................... | 382/195 |
| 2009/0196475 A1 * | 8/2009 | Demirli et al. ................ | 382/128 |
| 2010/0021056 A1 * | 1/2010 | Chen ............................. | 382/165 |
| 2010/0092085 A1 * | 4/2010 | Marchesotti ................. | 382/173 |
| 2010/0177981 A1 * | 7/2010 | Wang et al. ................... | 382/260 |
| 2010/0195911 A1 * | 8/2010 | Yen et al. ...................... | 382/190 |

OTHER PUBLICATIONS

Jones, et al.,"Statistical Color Models with Application to Skin Detection," Technical Report, CRL 98/11, Dec. 1998.
Garcia, et al.,"Face Detection Using Quantized Skin Color Regions Merging and Wavelet Packet Analysis," Transactions on Multimedia,V.1,No. 3,Sep. 1999.
Hsu, et al.,"Face Detection in Color Images," PAMI, pp. 696-706, May 2002.
Mita, et al.,"Joint Haar-Like Features for Face Detection," ICCV, pp. 1619-1626, Oct. 2005.

* cited by examiner

*Primary Examiner* — Aaron W Carter
(74) *Attorney, Agent, or Firm* — SoCal IP Law Group LLP; Steven C. Sereboff; Jonathan Pearce

(57) ABSTRACT

The subject application is directed to a system and method for image facial detection employing skin tones. Image data comprised of a plurality of pixels encoded in at least a three dimensional component space is received and sub-sampled region data is generated from the received image data. A percentage of pixels having a low chroma value below a threshold value is then calculated and tested against a predetermined percentage threshold value. Each pixel is then classified in accordance with a skin tone model. Skin tone map data is then generated based on classification and a skin tone mask is output form the map data.

18 Claims, 27 Drawing Sheets
(14 of 27 Drawing Sheet(s) Filed in Color)

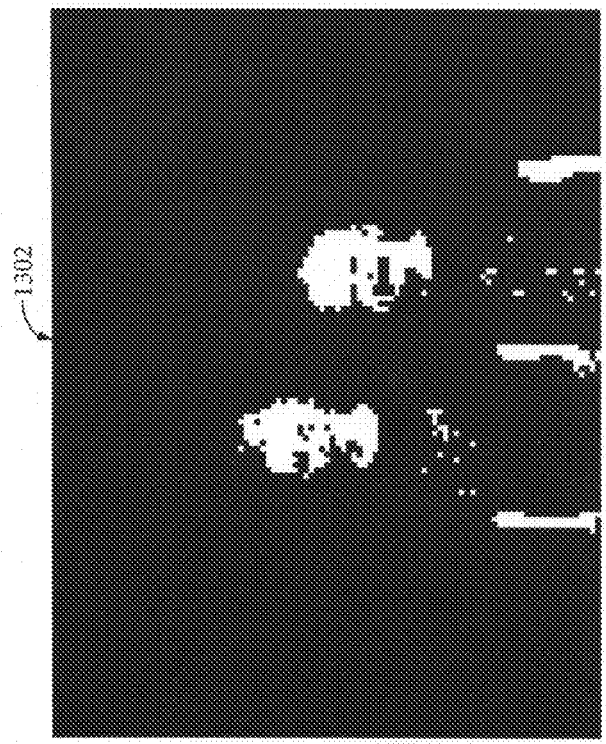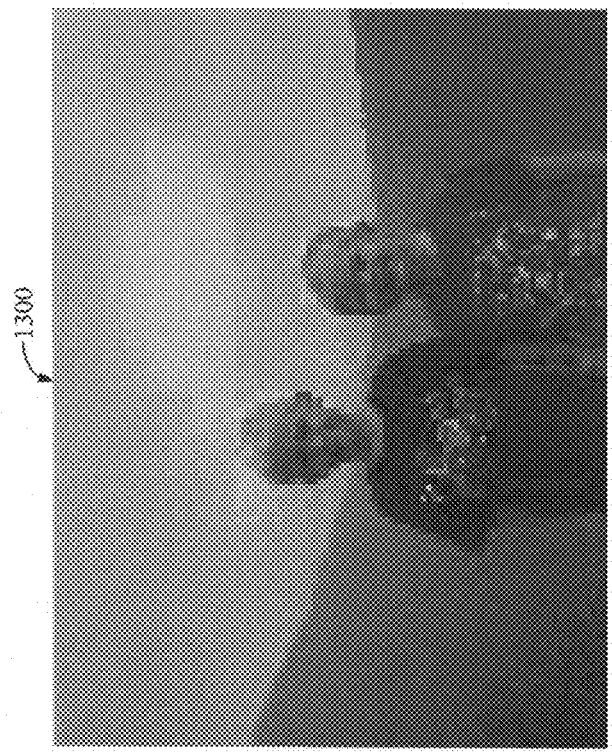
FIGURE 13

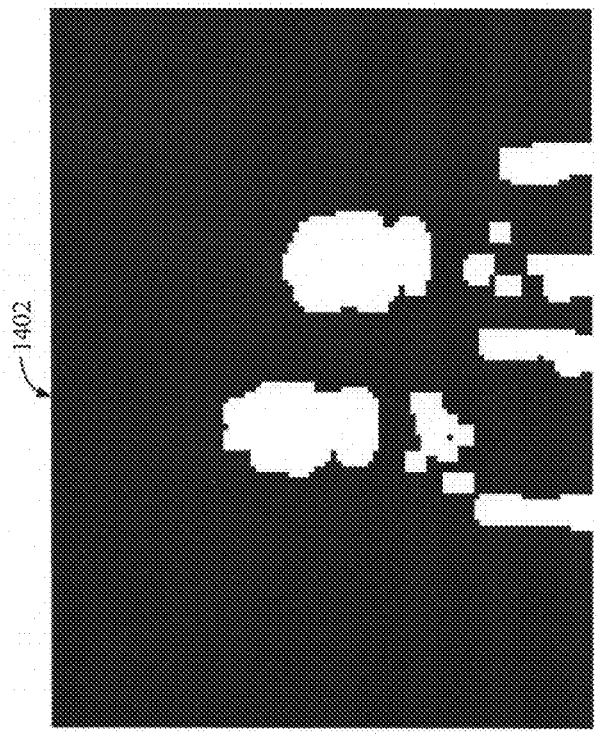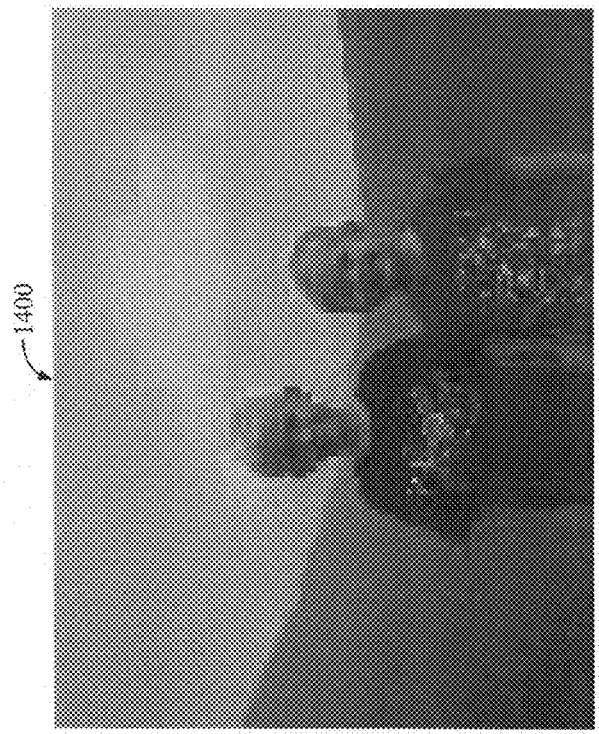
FIGURE 14

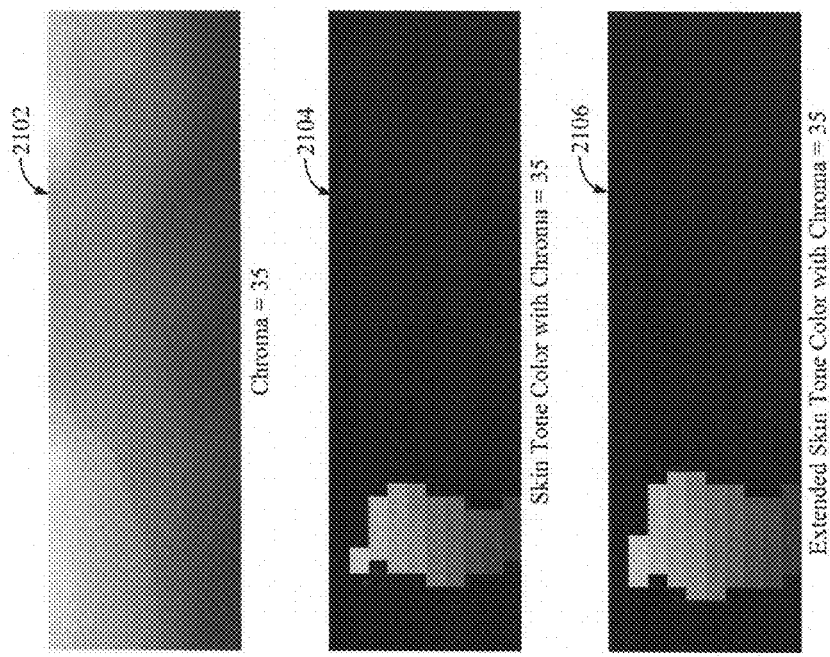
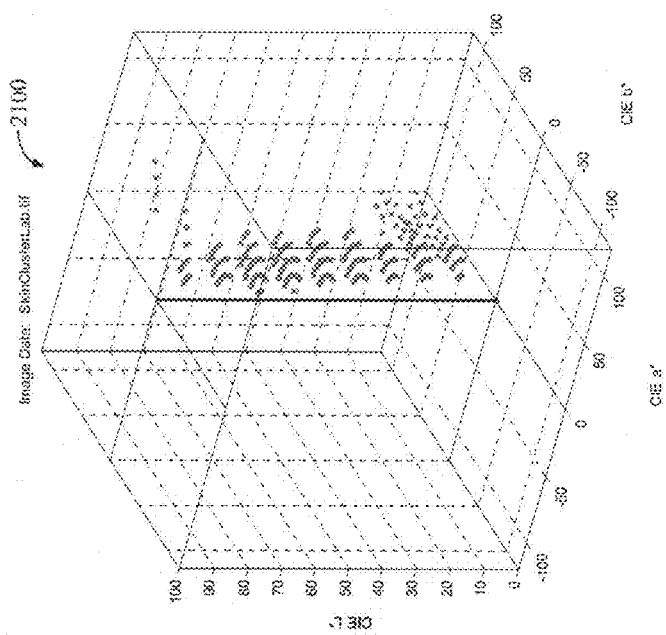
*FIGURE 21*

Program Statistics
--------
Command line at 2008 Apr 22 14:42: "C:\RDC_Face\TFD_V2\bin\debug\tfdSample" -i "C:\DSE Face Database_PPM\57638997_017c191f6a.ppm" -o out.pgm Module Statistics for tfdsample.exe
--------
Time in module: 3613.436 millisecond

| Func Time | % | Func+Child Time | % | Hit Count | Function |
|---|---|---|---|---|---|
| 246.369 | 6.8 | 3190.918 | 88.3 | 499007 | _tfdClassifierClassify (tfdclassifier.obj) |
| 101.540 | 2.8 | 3356.355 | 92.9 | 1 | _tfdDetectSTILL@16 (tfdstill.obj) |
| 20.569 | 0.6 | 3613.425 | 100.0 | 1 | _main (tfdsample.obj) |

*FIGURE 24*

```
Program Statistics
------------------
    Command line at 2008 Apr 26 14:10: "C:\RDC_Face\TFD_V2\bin\debug\tfdSample" -i "C:\DSE Face
Database_PPM\57638997_017c191f6a.ppm" -o out.pgm Module Statistics for tfdsample.exe
-----------------------------------
Time in module: 822.341 millisecond Func           Func+Child           Hit
Time   %       Time      %          Count  Function
---------------------------------------------------
...
36.008  4.4    721.492  87.7        71250  _tfdClassifierClassify (tfdclassifier.obj)

16.741  2.0    786.271  95.6            1    _tfdDetectMaskSTILL@20 (tfdmaskstill.obj)

11.924  1.4     11.924   1.4            1    SkinToneMask(struct tfdImage *,unsigned char *,struct tfdMask *) (tfdsample.obj)

0.046  0.0    821.583  99.9            1    _main (tfdsample.obj)
...
```

*FIGURE 25*

SYSTEM AND METHOD FOR IMAGE FACIAL AREA DETECTION EMPLOYING SKIN TONES

BACKGROUND OF THE INVENTION

The subject application is directed generally to improving quality of digitally encoded color images. The application is particularly applicable to isolation or detection of facial areas in image data and improving the color characteristics thereof.

More recently, images are acquired as encoded, digital image data. Such image data is obtained via devices such as digital cameras, both for still images and moving pictures. Digital image data is also acquired by scanning of tangible images, such as from pictures or negatives obtained via more traditional, film-based cameras. Color image data is typically encoded in a multidimensional color space, such as red-green-blue (RGB); cyan-magenta-yellow (CYM), which may include black (CYMK); or any other of a plurality of alternative encoding schemes.

A large number of images include depictions of human faces, which frequently form the area or areas of greatest interest to a viewer. It is desirable to have as accurate a detection of facial images as possible. Earlier systems, operable on a black-and-white rendering of a digital image, sought to isolate a facial region for special treatment. However, such systems are prone to false positives, and are generally separated from any system that seeks to perform image correction.

SUMMARY OF THE INVENTION

In accordance with one embodiment of the subject application, there is provided a system and method for image facial area detection employing skin tones. Image data comprised of a plurality of pixels encoded in at least a three dimensional component space is received sub-sampled region data is generated from the received image data. A percentage of pixels having a low chroma value below a threshold value is then calculated and tested against a predetermined percentage threshold value. Each pixel is then classified in accordance with a skin tone model. Skin tone map data is then generated based on classification and a skin tone mask is output form the map data.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject application is described with reference to certain figures, including:

FIG. 13 illustrates the sub-sampled image of the input image of FIG. 11 in accordance with the system for image facial area detection employing skin tones according to one embodiment of the subject application;

FIG. 14 illustrates the sub-sampled image of the input image of FIG. 11 and its associated skin tone map after dilation in accordance with the system for image facial area detection employing skin tones according to one embodiment of the subject application;

FIG. 21 is an illustration of extended skin tone colors in accordance with the system for image facial area detection employing skin tones according to one embodiment of the subject application;

FIG. 24 is an example illustrating an excerpt from profile analysis of an input image without skin tone mask in accordance with the system for image facial area detection employing skin tones according to one embodiment of the subject application;

FIG. 25 is an example illustrating an excerpt from profile analysis with skin tone mask in accordance with the system for image facial area detection employing skin tones according to one embodiment of the subject application;

DETAILED DESCRIPTION OF THE PREFERRED EMBODIMENT

The subject application is directed to a system and method for improving the quality of digitally encoded color images. In particular, the subject application is directed to a system and method for isolating or detecting facial areas in image data and improving the color characteristics of these areas. More particularly, the subject application is directed to a system and method for image facial area detection employing skin tones. It will become apparent to those skilled in the art that the system and method described herein are suitably adapted to a plurality of varying electronic fields employing color processing, including, for example and without limitation, communications, general computing, data processing, document processing, financial transactions, vending of products or services, or the like. The preferred embodiment, as depicted in FIG. 1, illustrates a document processing field for example purposes only and is not a limitation of the subject application solely to such a field.

Figure 1:
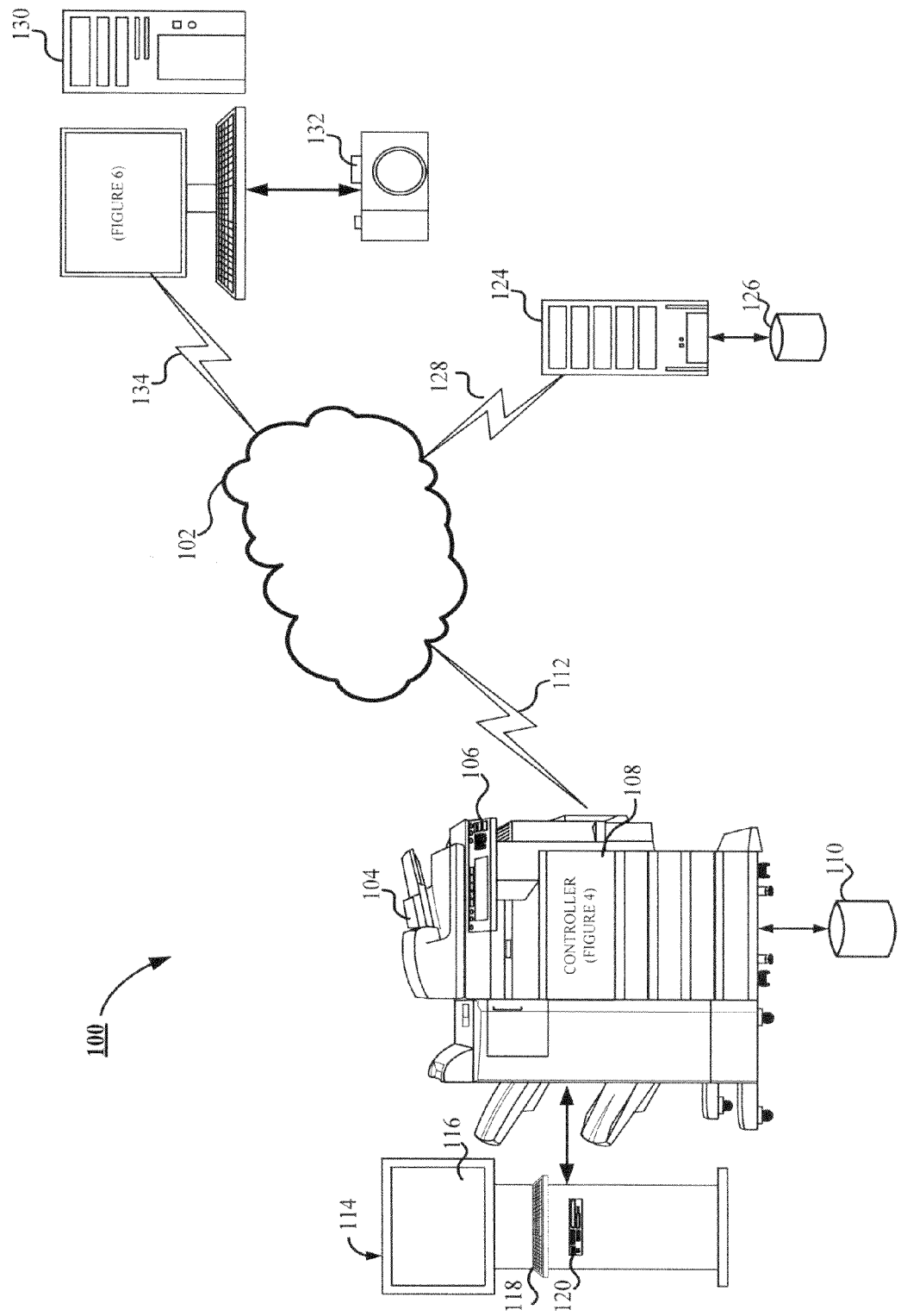
FIG. 1 is an overall diagram of a example system for implementation of the system and method for image facial area detection employing skin tones according to one embodiment of the subject application.

Referring now to FIG. 1, there is shown an overall diagram of a system 100 for image facial area detection employing skin tones in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for image facial area detection employing skin tones. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, photographic data, color processing data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like.

FIG. 1 also illustrates a kiosk 114 communicatively coupled to the document processing device 104, and in effect, the computer network 102. It will be appreciated by those skilled in the art that the kiosk 114 is capable of being implemented as a separate component of the document processing device 104, or as an integral component thereof. Use of the kiosk 114 in FIG. 1 is for example purposes only, and the skilled artisan will appreciate that the subject application is capable of implementation without the use of the kiosk 114. In accordance with one embodiment of the subject application, the kiosk 114 includes an associated display 116, and a user input device 118. As will be understood by those skilled in the art the kiosk 114 is capable of implementing a combination user input device/display, such as a touchscreen interface. According to one embodiment of the subject application, the kiosk 114 is suitably adapted to display color image data, photographic data, and the like.

The system 100 of FIG. 1 also includes a portable storage device reader 120, coupled to the kiosk 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 illustrated in FIG. 1 further depicts a backend component, shown as the server 124, in data communication with the computer network 102 via a communications link 128. It will be appreciated by those skilled in the art that the server 124 is shown in FIG. 1 as a component of the system 100 for example purposes only, and the subject application is capable of implementation without the use of a separate backend server component. The skilled artisan will appreciate that the server 124 comprises hardware, software, and combinations thereof suitably adapted to provide one or more services, web-based applications, storage options, and the like, to networked devices. In accordance with one example embodiment of the subject application, the server 124 includes various components, implemented as hardware, software, or a combination thereof, for managing retention of images, photographs, documents, text data, and the like, which are accessed via the computer network 102. The communications link 128 is any suitable data communications means known in the art including, but not limited to wireless communications comprising, for example and without limitation Bluetooth, WiMax, 802.11a, 802.11b, 802.11g, 802.11(x), a proprietary communications network, infrared, the public switched telephone network, optical, or any suitable wireless data transmission system, or wired communications known in the art. It will further be appreciated by those skilled in the art that the components described with respect to the server 124 are capable of implementation on any suitable computing device coupled to the computer network 102, e.g. the controller 108, or the like.

Communicatively coupled to the server 124 is the data storage device 126. According to the foregoing example embodiment, the data storage device 126 is any mass storage device, or plurality of such devices, known in the art including, for example and without limitation, magnetic storage drives, a hard disk drive, optical storage devices, flash memory devices, or any suitable combination thereof. In such an embodiment, the data storage device 126 is suitably adapted to store color imaging data, color images, photographs, documents, and the like. It will be appreciated by those skilled in the art that while illustrated in FIG. 1 as being a separate component of the system 100, the data storage device 126 is capable of being implemented as an internal storage component of the server 124, or the like, such as, for example and without limitation, an internal hard disk drive, or the like.

Also depicted in FIG. 1 is a user device, illustrated as a computer workstation 130 in data communication with the computer network 102 via a communications link 134. It will be appreciated by those skilled in the art that the computer workstation 130 is shown in FIG. 1 as a workstation computer for illustration purposes only. As will be understood by those skilled in the art, the computer workstation 130 is representative of any personal computing device known in the art including, for example and without limitation, a laptop computer, a personal computer, a personal data assistant, a web-enabled cellular telephone, a smart phone, a proprietary network device, or other web-enabled electronic device. According to one embodiment of the subject application, the workstation 130 further includes software, hardware, or a suitable combination thereof configured to interact with the document processing device 104, communicate with the server 124, or the like.

The communications link 134 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the computer workstation 134 is suitably configured to perform image processing, color image modification, imaging calculations, generate output data, or the like, with respect to the document processing device 104, or any other similar device coupled to the computer network 102. The functioning of the computer workstation 134 will better be understood in conjunction with the block diagram illustrated in FIG. 6, explained in greater detail below.

Additionally, the system 100 of FIG. 1 depicts an image capture device, illustrated as a digital camera 132 in data communication with the workstation 130. The skilled artisan will appreciate that the camera 132 is representative of any image capturing device known in the art, and is capable of being in data communication with the document processing device 104, the workstation 130, the server 124, or the like. In accordance with one embodiment of the subject application, the camera 132 is capable of functioning as a portable storage device via which image data is received by the workstation 130, as will be understood by those skilled in the art.

Figure 2:
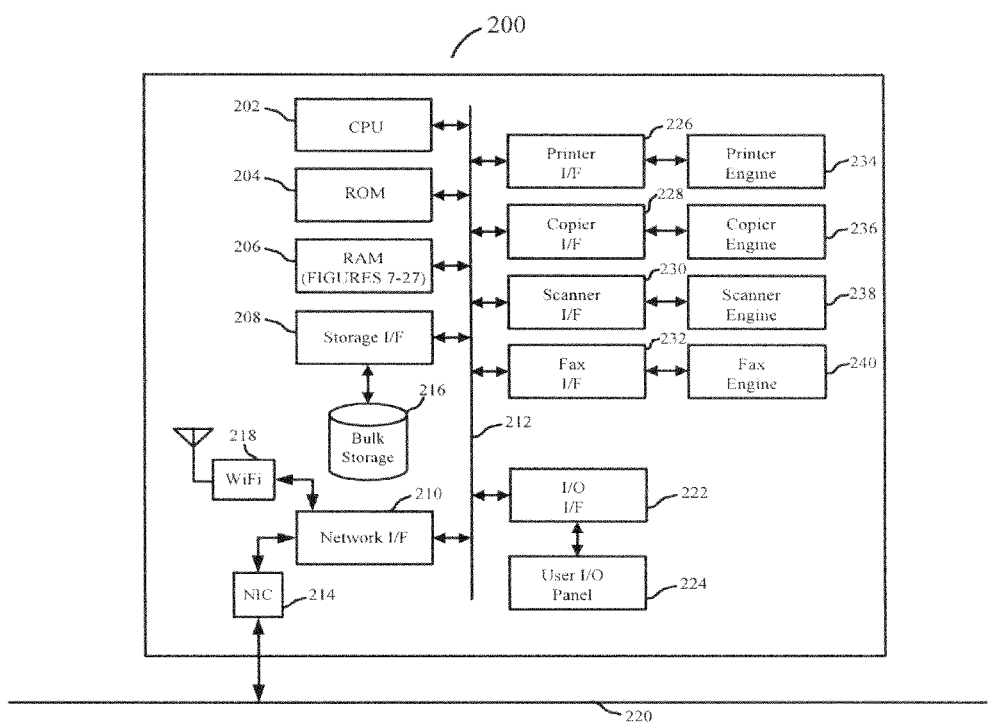
FIG. 2 is a block diagram illustrating device hardware for use in the system for image facial area detection employing skin tones according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
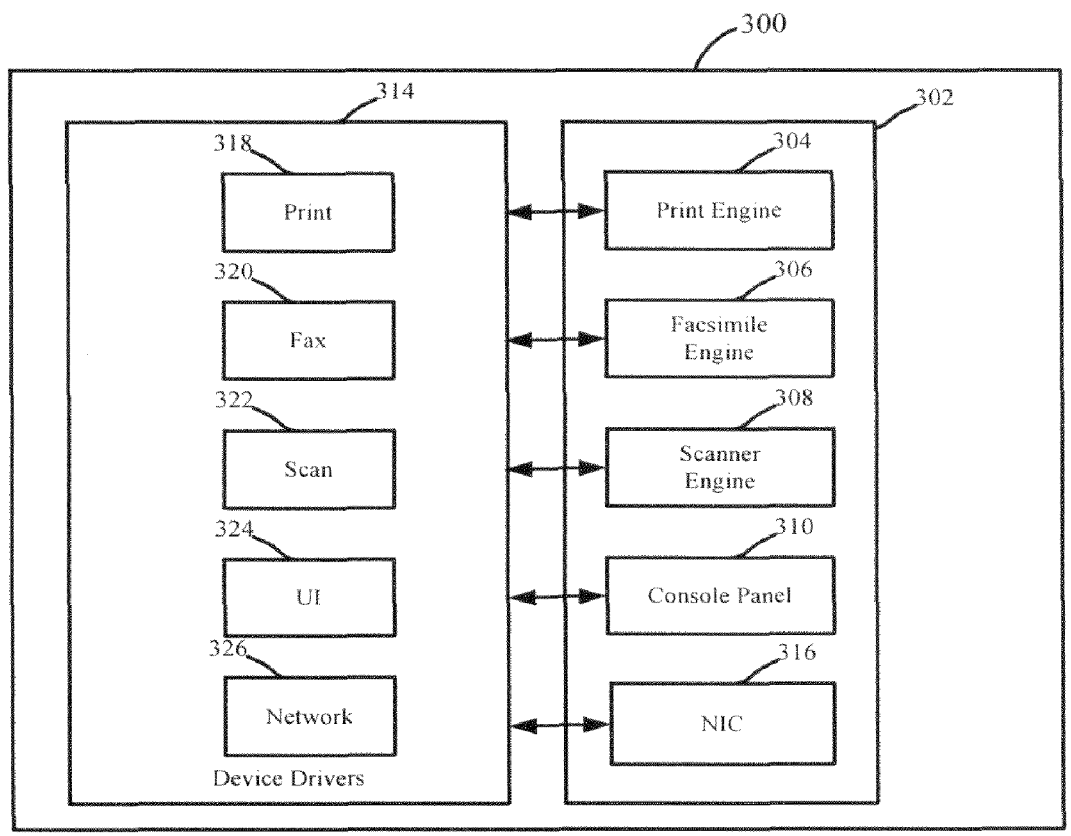
FIG. 3 is a functional diagram illustrating the device for use in the system for image facial area detection employing skin tones according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
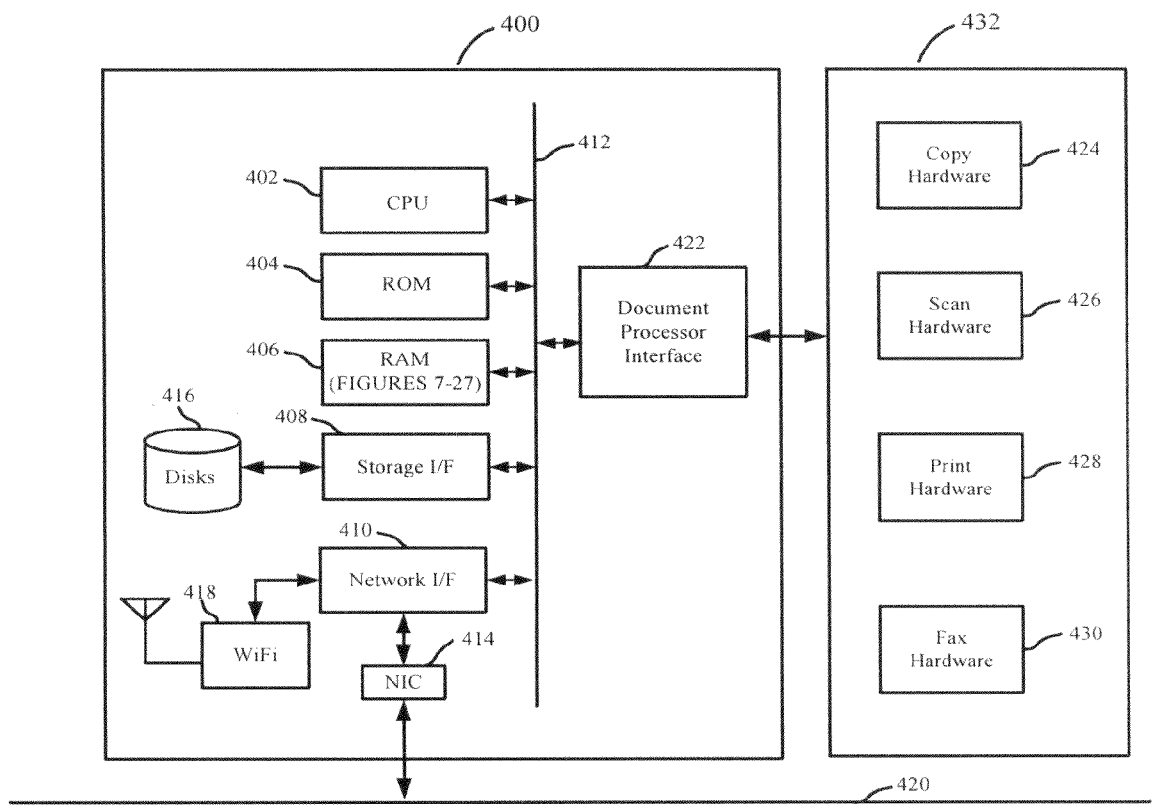
FIG. 4 is a block diagram illustrating controller hardware for use in the system for image facial area detection employing skin tones according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
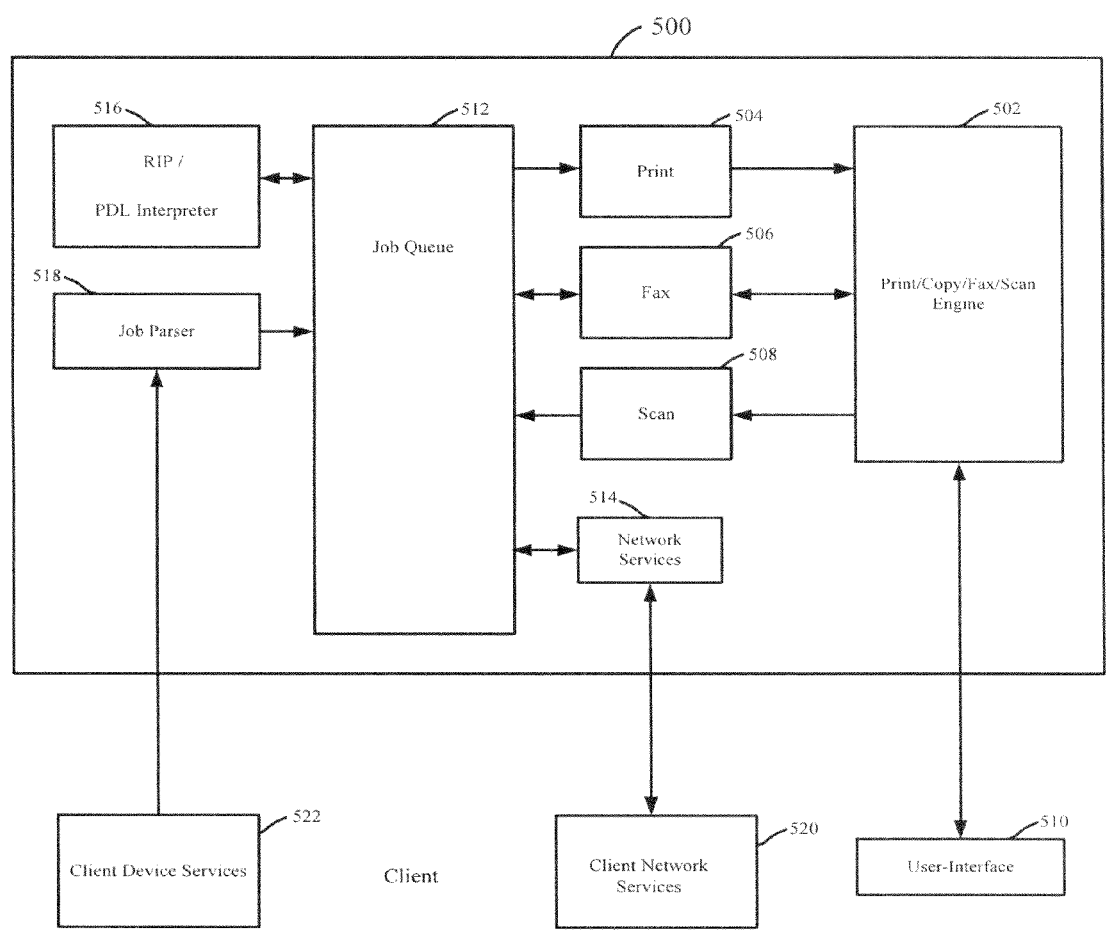
FIG. 5 is a functional diagram illustrating the controller for use in the system for image facial area detection employing skin tones according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment includes a document processing engine 502. Suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
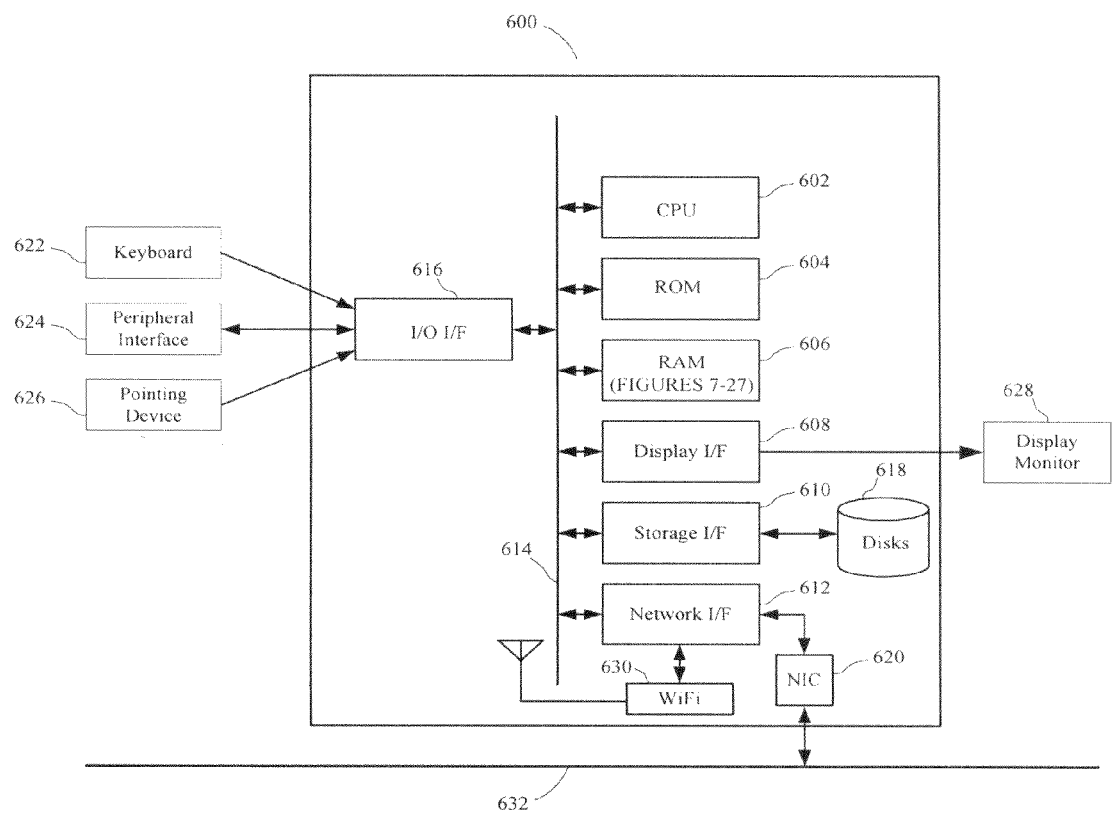
FIG. 6 is a diagram illustrating a workstation for use in the system for image facial area detection employing skin tones according to one embodiment of the subject application.

Turning now to FIG. 6, illustrated is a hardware diagram of a suitable workstation 600, shown in FIG. 1 as the computer workstation 130, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
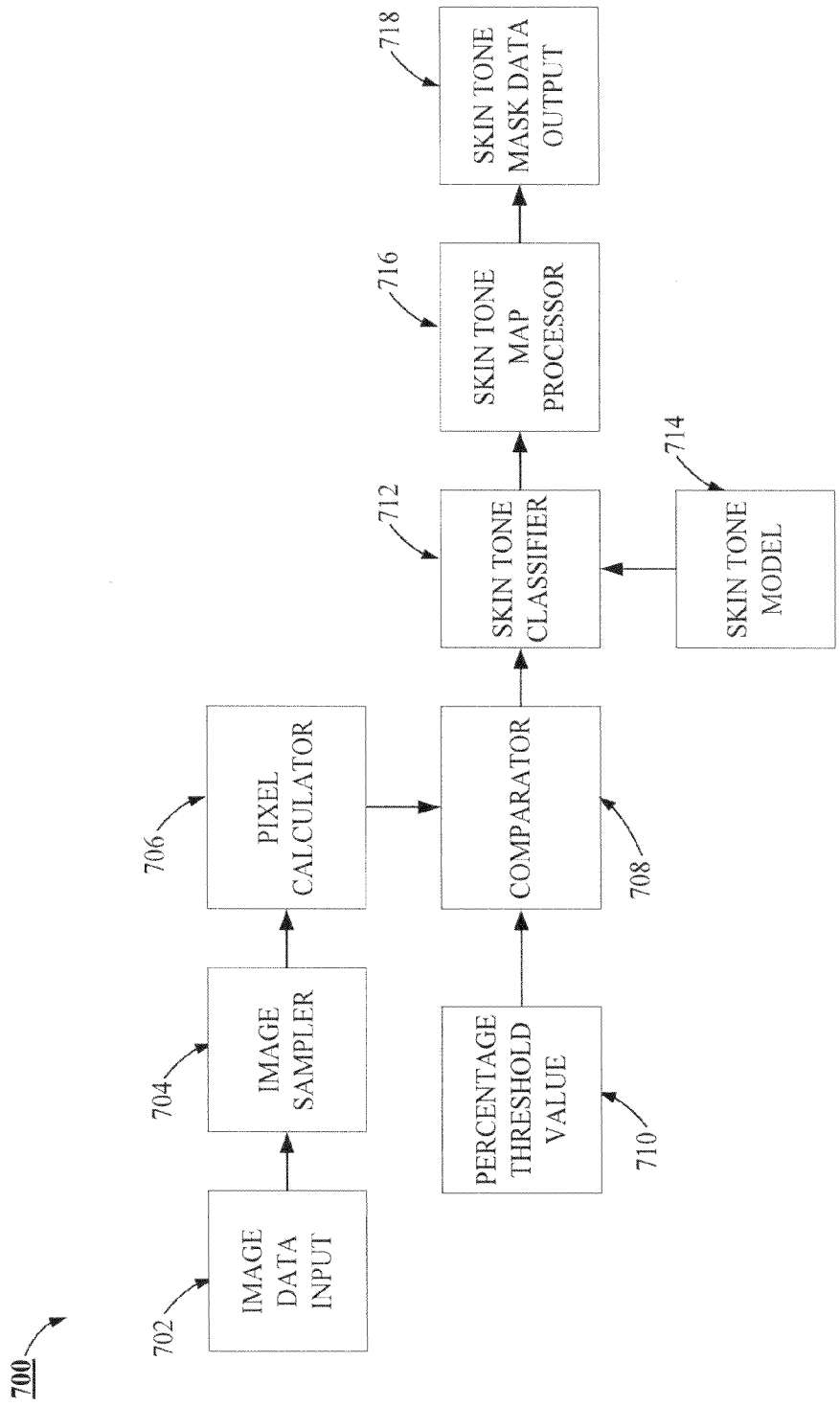
FIG. 7 is a block diagram illustrating one example system for image facial area detection employing skin tones according to one embodiment of the subject application.

Turning now to FIG. 7, illustrated is a block diagram of a system 700 for image facial area detection employing skin tones in accordance with one embodiment of the subject application. The system 700 includes an image input 702 configured to receive image data comprising pixels encoded in a three dimensional component color space. The system 700 further includes an image sampler 704 that is configured to generate sub-sampled image data from the image data. The system 700 of FIG. 7 also includes a pixel calculator 706 so as to calculate a percentage of pixels in the generated sub-sampled image data having an associated chroma value less than a predetermined threshold value. The output of the pixel calculator 706 is received by a comparator 708 that is configured to compare the calculated percentage of pixels against a predetermined percentage threshold value 710. A skin tone classifier 712 then classifies each pixel in the sub-sample image data in accordance with an associated skin tone model 714. The system 700 further includes a skin tone processor 716 that generates skin tone map data based upon the output of the skin tone classifier 712. In addition, the system includes a skin tone mask data output 718 that outputs such skin tone mask data in accordance with the generated skin tone map data.

Figure 8:
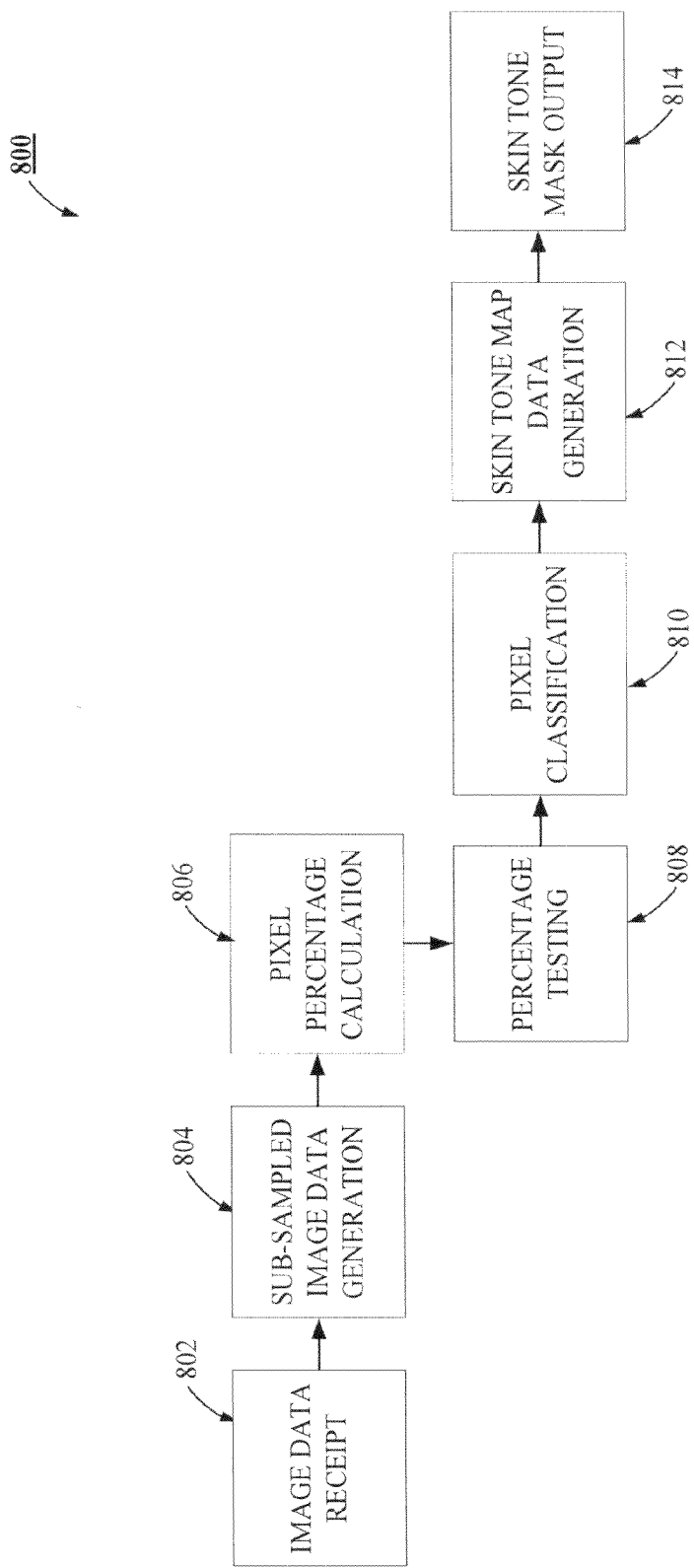
FIG. 8 is a functional diagram illustrating one example system for image facial area detection employing skin tones according to one embodiment of the subject application.

Referring now to FIG. 8, there is shown a functional diagram illustrating the system 800 for image facial area detection employing skin tones in accordance with one embodiment of the subject application. Image data receipt 802 first occurs corresponding to the receipt of image data consisting of pixels encoded in at least a three-dimensional component color space. Next, sub-sampled image data generation 804 occurs corresponding to sampling of the image data received at 802. Pixel percentage calculation 806 is then performed of pixels in the generated sub-sampled image data so as to determine the percentage of pixels in the data having an associated chroma value less than a predetermined threshold value. Percentage testing 808 then occurs corresponding to a test of the calculated percentage of pixels against a predetermined percentage threshold value. Next, pixel classification 810 is performed for each pixel in the sub-sampled image data, resulting in a classification thereof in accordance with an associated skin tone model. Skin tone map data generation 812 then occurs of skin tone map data based upon the output of the pixel classification 810. Skin tone mask data output 814 is then performed corresponding to the output of skin tone mask data in accordance with the generated skin tone map data.

Figure 9:
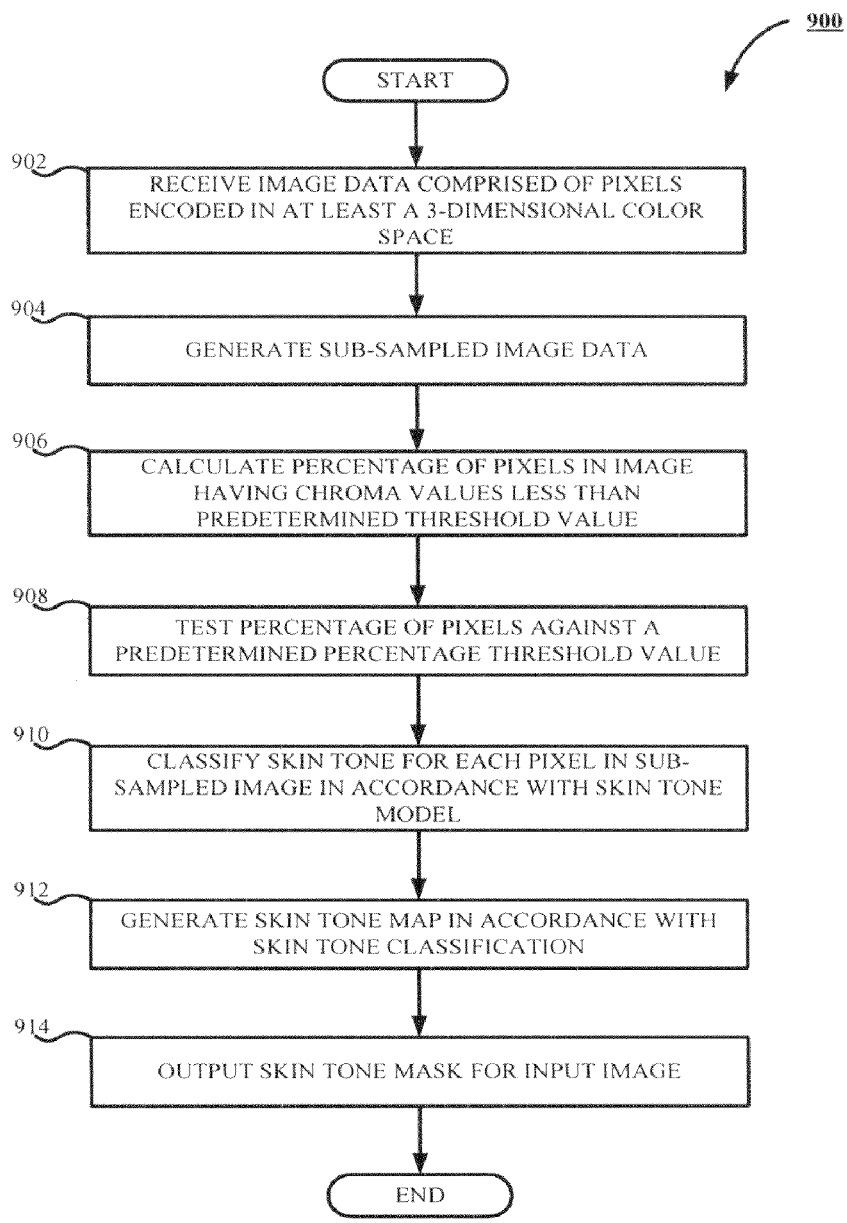
FIG. 9 is a flowchart illustrating a method for image facial area detection employing skin tones according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10, as well as the example implementations and illustrations depicted in FIGS. 11-27. Turning now to FIG. 9, there is shown a flowchart 900 illustrating an image facial area detection employing skin tones method in accordance with one embodiment of the subject application. Beginning at step 902, image data is received comprised of a plurality of pixels that are encoded in at least a three-dimensional color space. At step 904, sub-sampled region data is generated from the received image data. A percentage of pixels having an associated chroma value less than a predetermined threshold value in the generated sub-sampled image data is then calculated at step 906.

At step 908, the calculated percentage of pixels is tested against a predetermined percentage threshold value. Each pixel in the sub-sampled image data is then classified in accordance with an associated skin tone model at step 910. Skin tone map data is then generated at step 912 corresponding to an output of the pixel classification. Operations then proceed to step 914, whereupon skin tone mask data is output in accordance with the generated skin tone map data.

Figure 10:
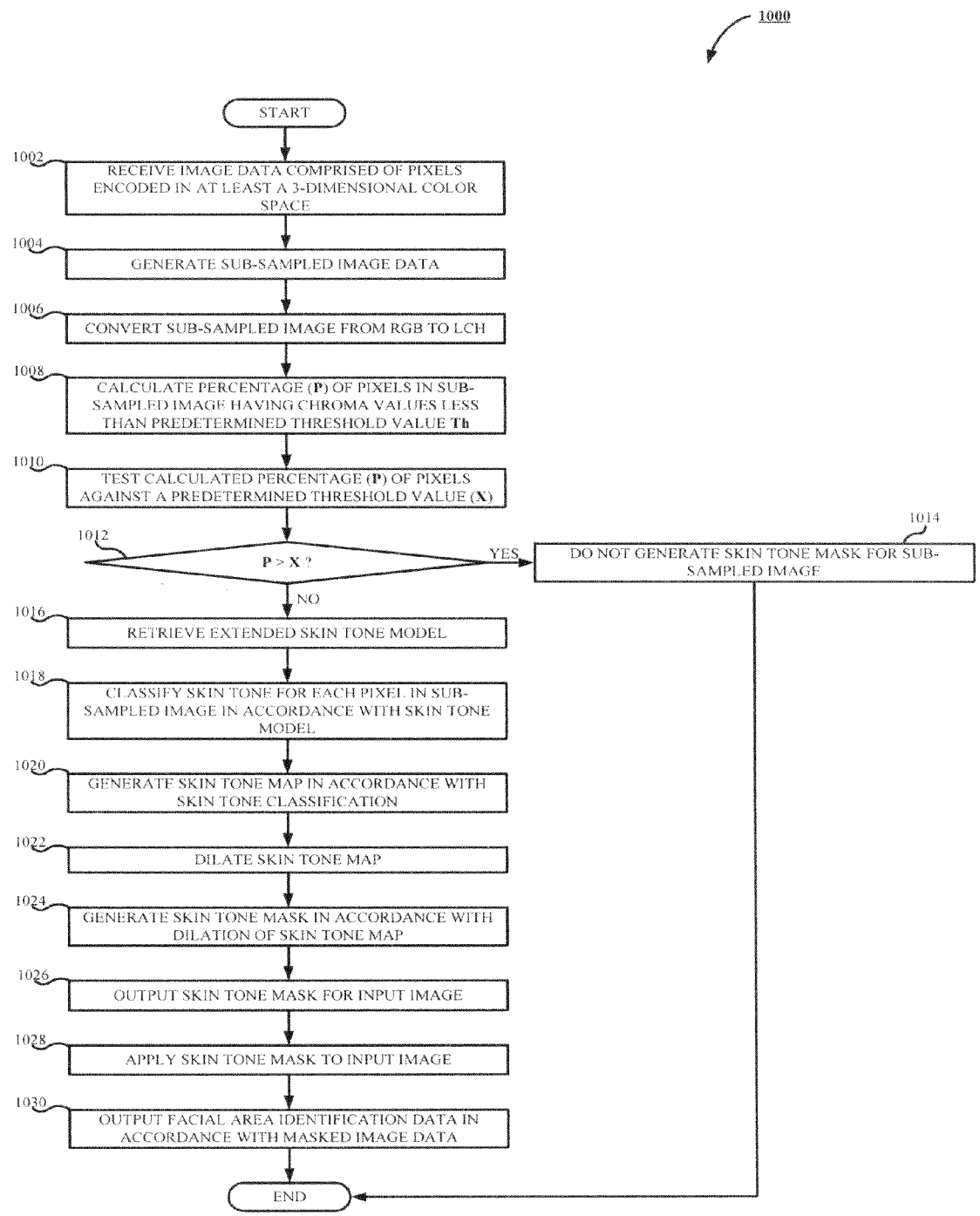
FIG. 10 is a flowchart illustrating a method for image facial area detection employing skin tones according to one embodiment of the subject application.

Referring now to FIG. 10, there is shown a flowchart 1000 illustrating one example implementation of image facial area detection employing skin tones so as to verify faces detected in accordance with one embodiment of the subject application. The methodology of FIG. 10 begins at step 1002, whereupon input data is received corresponding to an input image consisting of pixels encoded in a three-dimensional color space, e.g. RGB color space, or the like. It will be appreciated by those skilled in the art that such an input image is capable of being received by the workstation 130 or controller 108 via operations of the document processing device 104, from network storage via the server 124, from image capturing via the digital camera 132, or the like. The skilled artisan will appreciate that the image processing performed in the subject application is capable of being performed by any suitable device capable of processing images including, for example and without limitation the controller 108 or other suitable component associated with the document processing device 104, the server 124, the computer workstation 130, the digital camera 132, or the like. For example purposes only with respect to FIGS. 10 through 27, reference is made hereinafter to the workstation 130 performing the methodology of FIG. 10, as will be understood by those skilled in the art.

Figure 11:
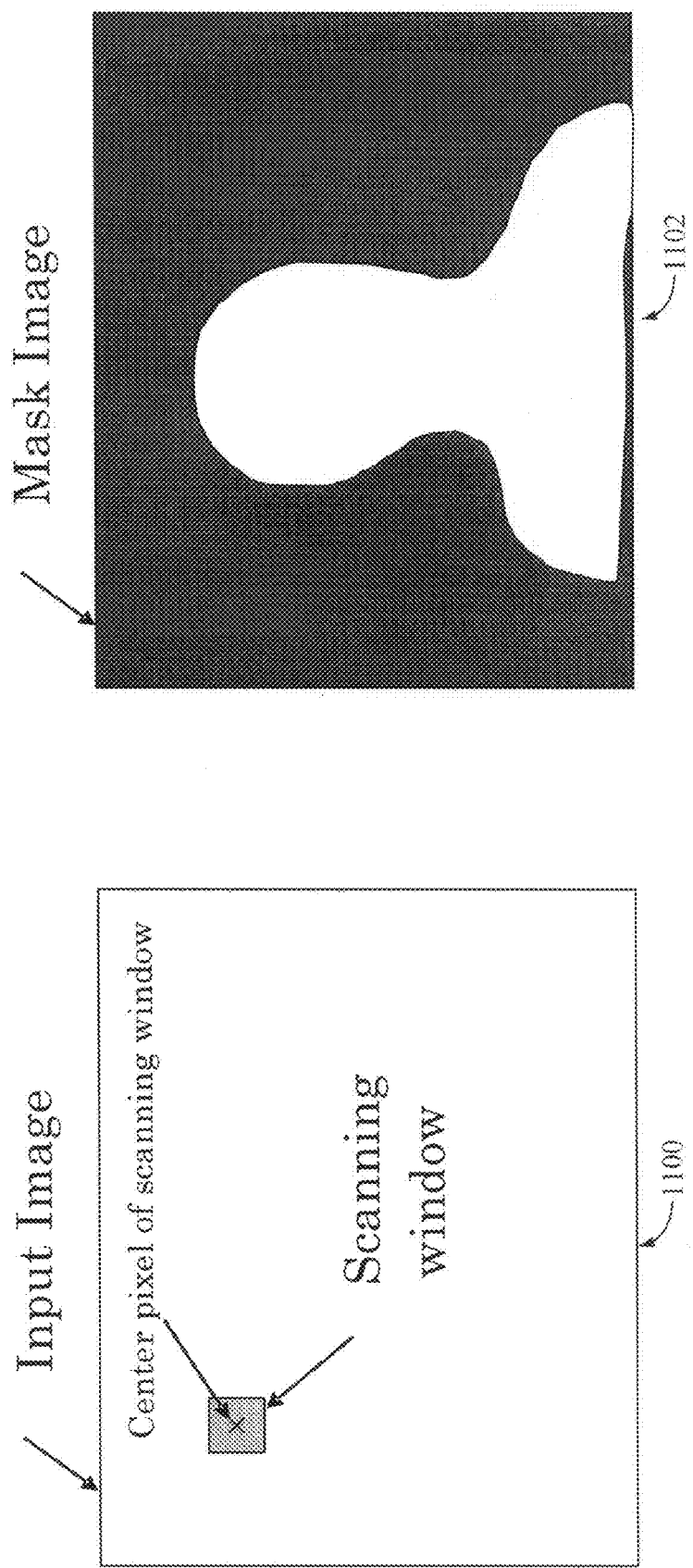
FIG. 11 is an example of an input image and associated face detection mask in accordance with the system for image facial area detection employing skin tones according to one embodiment of the subject application.

It will be appreciated by those skilled in the art that the methodology of FIG. 10 is suitably adapted for application in facial detection, thus reference is made to FIG. 11, which illustrates an example input image 1100 subjected to a face detector that locates any human faces in the image 1100 by testing if there is a face in a scanning window, which is capable of varying in size in scan line orders, i.e. from top-left to bottom right. FIG. 11 further illustrates one type of face detection wherein a masking scheme is implemented to block off pixels on which face detection is performed (mask image 1102). That is, if the center pixel 1104 of a scanning window 1106 is zero in the mask image 1102, then the detection is ignored or skipped by the face detection implementation. FIG. 13 illustrates a sample input image 1200 and its associated skin tone map 1202 (pixels in skin tone color are marked as white).

To reduce computational cost, skin tone detection is suitably performed on a sub-sampled image. Thus, at step 1004, sub-sampled region data is from the input image data via the computer workstation 130, as will be appreciated by those skilled in the art. FIG. 13 illustrates the sub-sampled image 1300 corresponding to the input image 1200 of FIG. 12, as well as a corresponding skin tone map 1302 of the sub-sampled image 1300.

Figure 12:
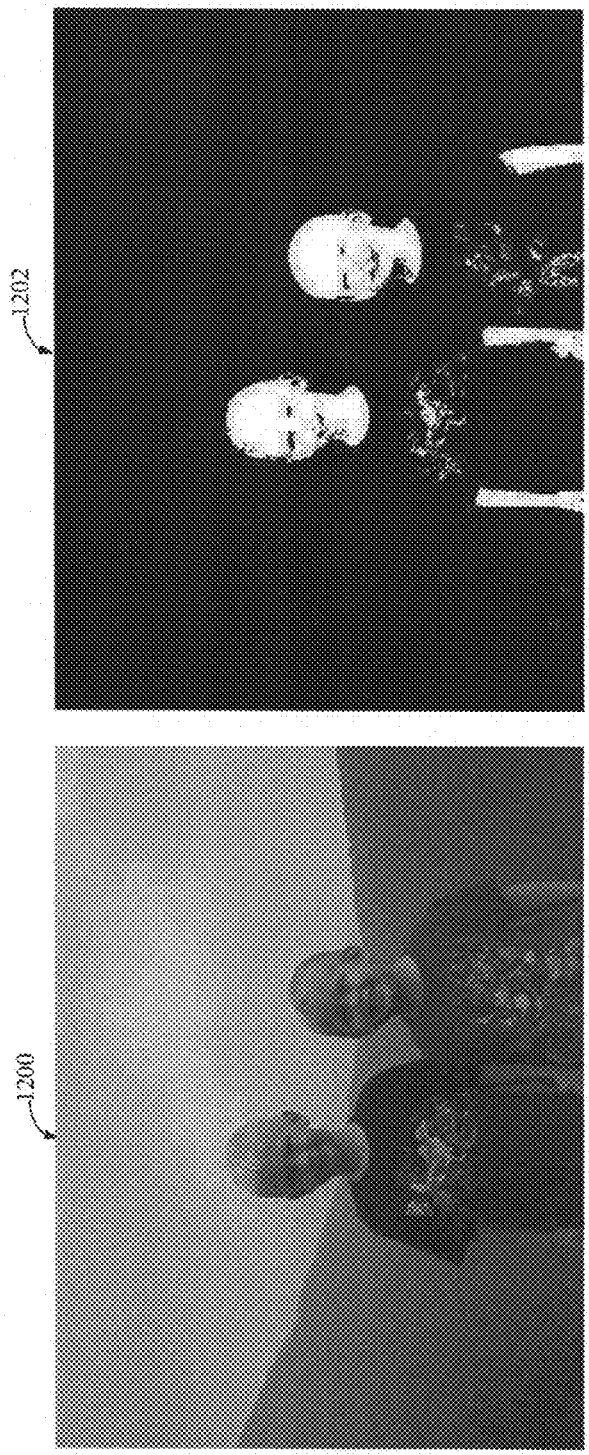
FIG. 12 is an example image and associated skin tone map in accordance with the system for image facial area detection employing skin tones according to one embodiment of the subject application.

The sub-sampled image data is then converted at step 1006 from RGB or other input color space to a Lightness, Chrominance, Hue color space, e.g. HSV or YCbCr color space. Conversion from an input color space to an output color space is capable of being performed in accordance with any suitable method for color conversion known in the art. As previously discussed, FIG. 12 illustrates a sample input image 1200 and its associated skin tone map 1202 (pixels in skin tone color are marked as white). Computational cost reduction of skin tone detection is accomplished via the use of a sub-sampled image. FIG. 13 illustrates the sub-sampled image 1300 corresponding to the input image 1200 of FIG. 12, as well as a corresponding skin tone map 1302 of the sub-sampled image 1300.

The workstation 130, controller 108, or other suitable device then calculates a percentage (P) of pixels in the converted sub-sampled image data having chroma values less than a predetermined threshold value (Th) at step 1008. In accordance with one embodiment of the subject application, the predetermined threshold value Th is set as 9. The calculated percentage P of pixels in the sub-sampled image data is then tested against a predetermined threshold value (X) at step 1010. A determination is then made at step 1012 whether the percentage of pixels P is greater than X, i.e. whether or not the sub-sampled image data has a percentage of low-chromatic pixels that exceeds a preset threshold percentage X, e.g. greater than 80%. In accordance with one embodiment of the subject application, the preset value X is set to 84%, however the skilled artisan will appreciate that suitable testing of the percentage is capable of being performed so as to alter the value X in accordance with the test results.

Figure 19:
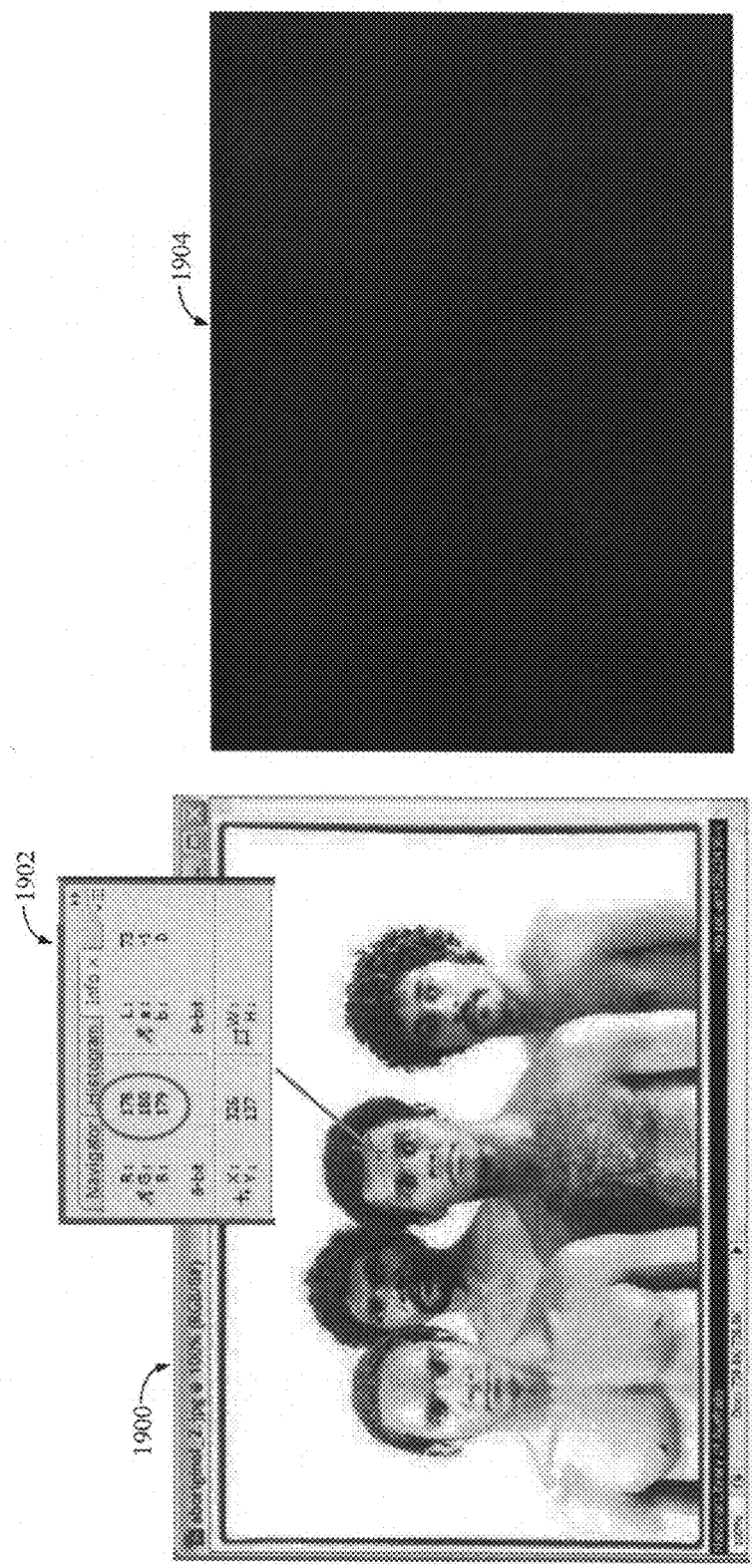
FIG. 19 is a near-monochromatic image example and associated skin tone map in accordance with the system for image facial area detection employing skin tones according to one embodiment of the subject application.
Figure 20:
FIG. 20 illustrates example input images corresponding to extreme cases in skin tone colors in accordance with the system for image facial area detection employing skin tones according to one embodiment of the subject application.

Upon a determination at step 1012 that P is greater than X, flow proceeds to step 1014, whereupon no skin tone mask is generated for the sub-sampled image data. FIGS. 19 and 20, discussed in greater detail below, describe examples of images for which application of skin tone masks should not occur in accordance with the subject application, e.g. monochromatic or near-achromatic images. Thereafter the analysis of the received input image is terminated with respect to FIG. 10.

When it is determined at step 1012 that P is not greater than X, i.e. the percentage of pixels having low chroma pixels does not exceed the preset value X, flow progresses to step 1016. At step 1016, an extended skin tone model is retrieved from storage corresponding to a skin tone model for use in the classification of pixels in the sub-sampled image data. FIGS. 20, 21, 22, and 23 describe a suitable example skin tone model, as well as the application thereof, in greater detail below. Each pixel in the sub-sampled image data is then classified as skin tone or not skin tone based upon the retrieved extended skin tone model at step 1018. That is, each pixel is either classified as having a color within the extended skin tone model, or does not, in which case the pixel should be masked.

At step 1020, a skin tone map is generated in accordance with the skin tone classification of the sub-sampled image data by the workstation 130, the controller 108, the digital camera 132, or the like. Operations then proceed to step 1022, whereupon the skin tone map is dilated by the controller 104, the workstation 130, the digital camera 132, or the like, so as to remove any noise arising during the sub-sampling of the image data. The dilation of skin tone map is discussed more fully below with respect to FIGS. 14, 15, 16, and 17, which illustrate example implementations of the dilation step, as well as suitable comparisons between non-dilated and dilated masking results.

A skin tone mask is then generated in accordance with the dilation of the skin tone map at step 1024. Flow then proceeds to step 1026, whereupon the controller 108, the workstation 130, or other suitable device performing the operations of FIG. 10 outputs a skin tone mask for the input image in accordance with the dilation of the skin tone maps generated from the skin tone classifications of the sub-sampled image data. At step 1028, the skin tone mask is applied to the input image, so as to reveal only those skin tone portions of the input image. At step 1030, facial area identification data is output in accordance with the masked input image.

Figure 15:
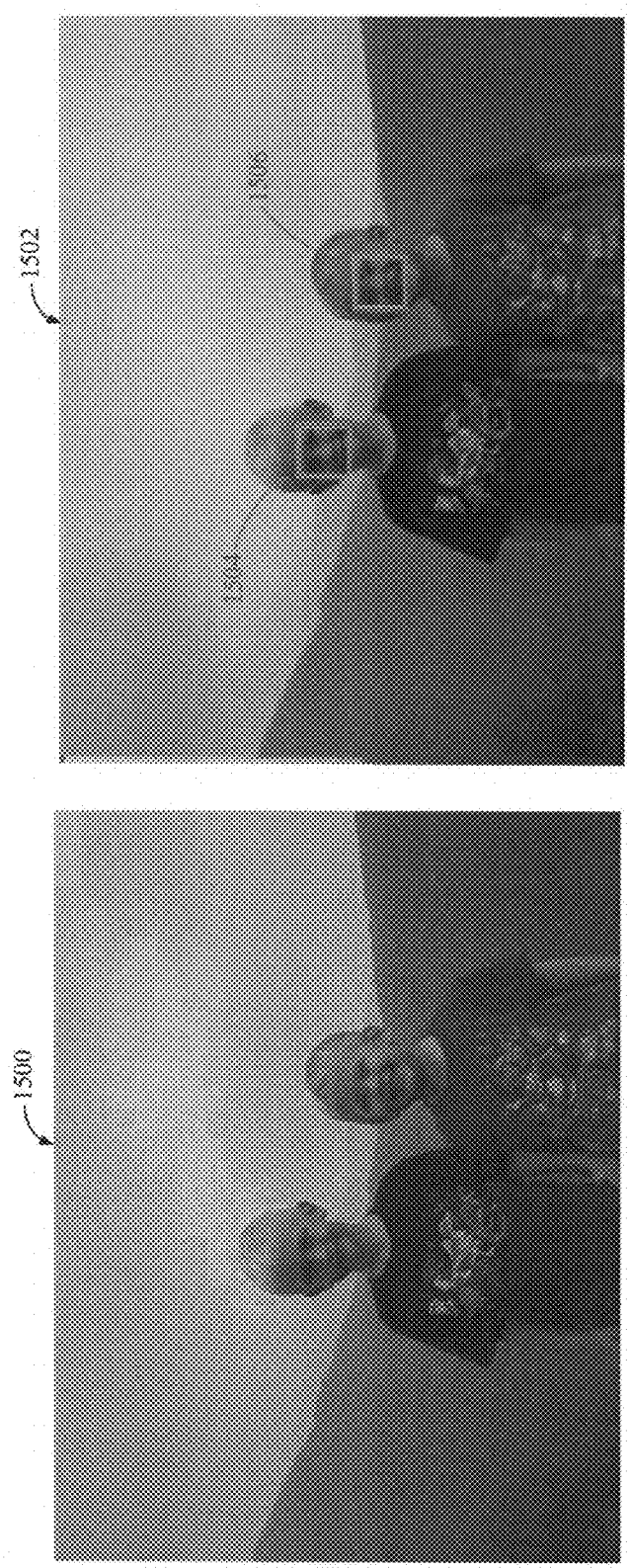
FIG. 15 depicts the input image of FIG. 11 with face detection results illustrated as detection rectangles over the facial region in accordance with the system for image facial area detection employing skin tones according to one embodiment of the subject application.
Figure 16:
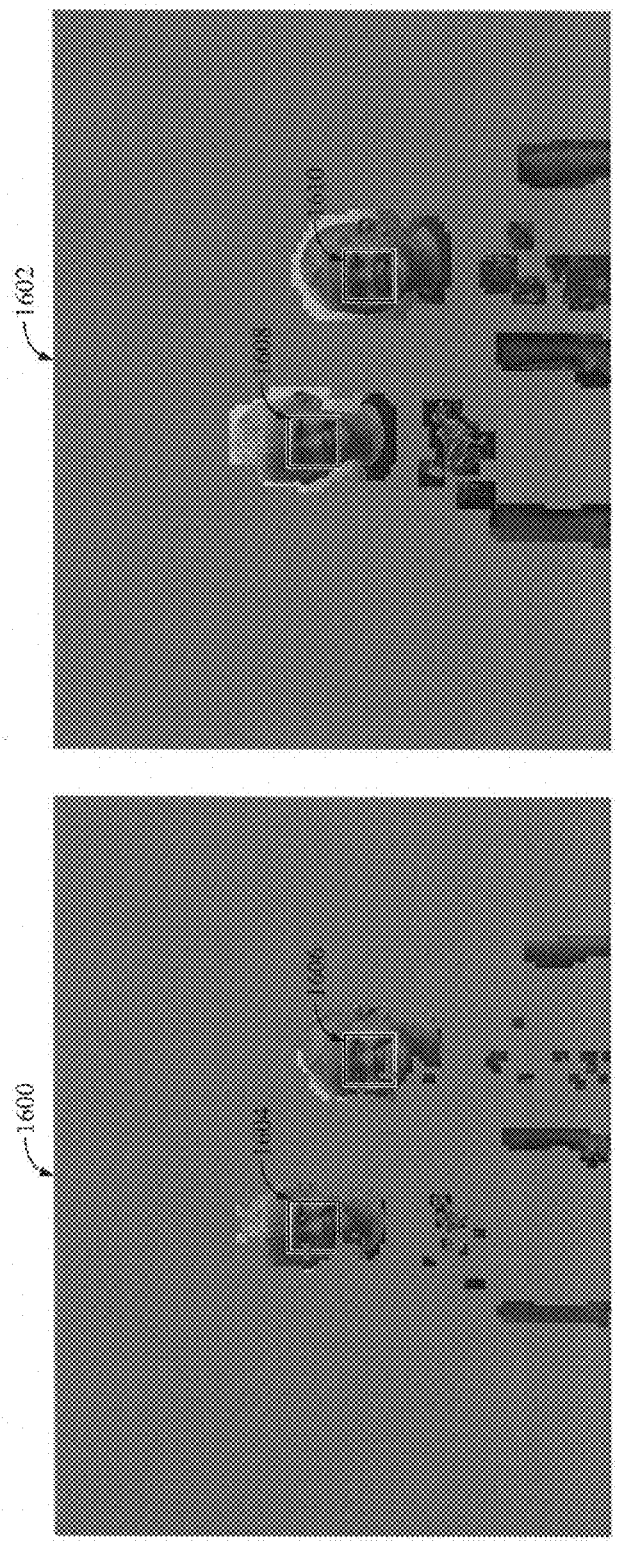
FIG. 16 is an example of skin tone masks superimposed over detection results with and without dilation corresponding to the input image of FIG. 11 in accordance with the system for image facial area detection employing skin tones according to one embodiment of the subject application.
Figure 17:
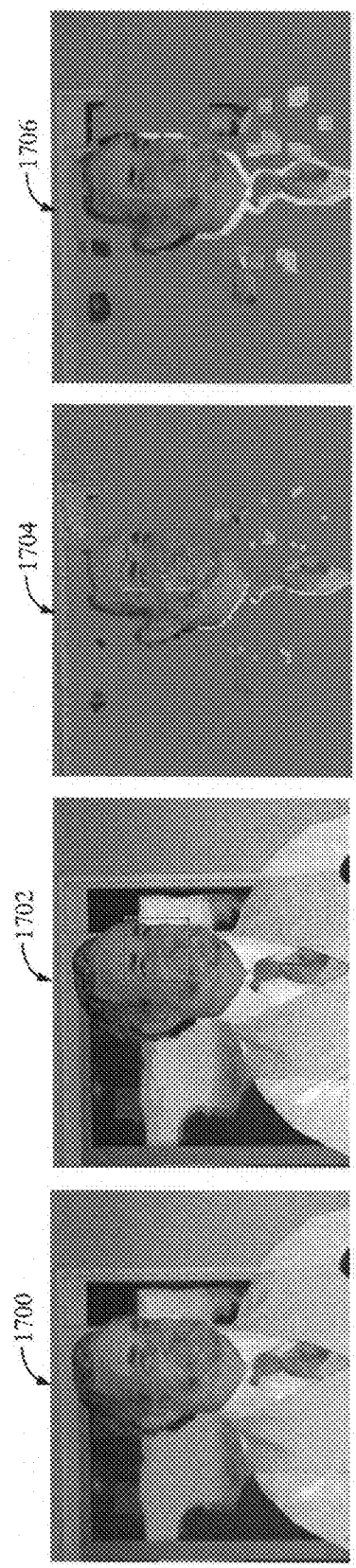
FIG. 17 is another example input image, detection results, and skin tone masks of the input image in accordance with the system for image facial area detection employing skin tones according to one embodiment of the subject application.

Turning now to FIG. 14, there is shown a sub-sampled image 1400 corresponding to the input image 1200 of FIG. 12 and its associated skin tone map 1402 subsequent to dilation. FIG. 15 illustrates the input image 1500 and face detection results 1502, wherein the results are illustrated as detection rectangles over the facial regions 1504 and 1506 of the image. FIG. 16 illustrates one implementation of the subject application demonstrating a comparison of the application of a skin tone mask prior to dilation 1600 with the application of a skin tone mask after dilation 1602. That is, that if the skin tone map is used as a skin tone mask, where non-skin tone pixels marked as red and superimposed on the detection result without dilation then the detection rectangles 1604 and 1606 include some non-skin tone pixels as illustrated in the image 1600. In contrast, application of the skin tone mask after dilation illustrated in the image 1602 demonstrates that the detection rectangles 1608 and 1610 include no non-skin tone pixels. It will be appreciated by those skilled in the art that the dilation that a further demonstration of the use of the dilation is illustrated in FIG. 17, which depicts an input image 1700, the image with face detection results 1702, the application of a skin tone mask without dilation 1704, and application of the skin tone mask after dilation 1706. It will be appreciated by the skilled artisan that application of a skin tone mask without dilation is capable of causing the face detection to miss, as illustrated in 1704.

Figure 18:
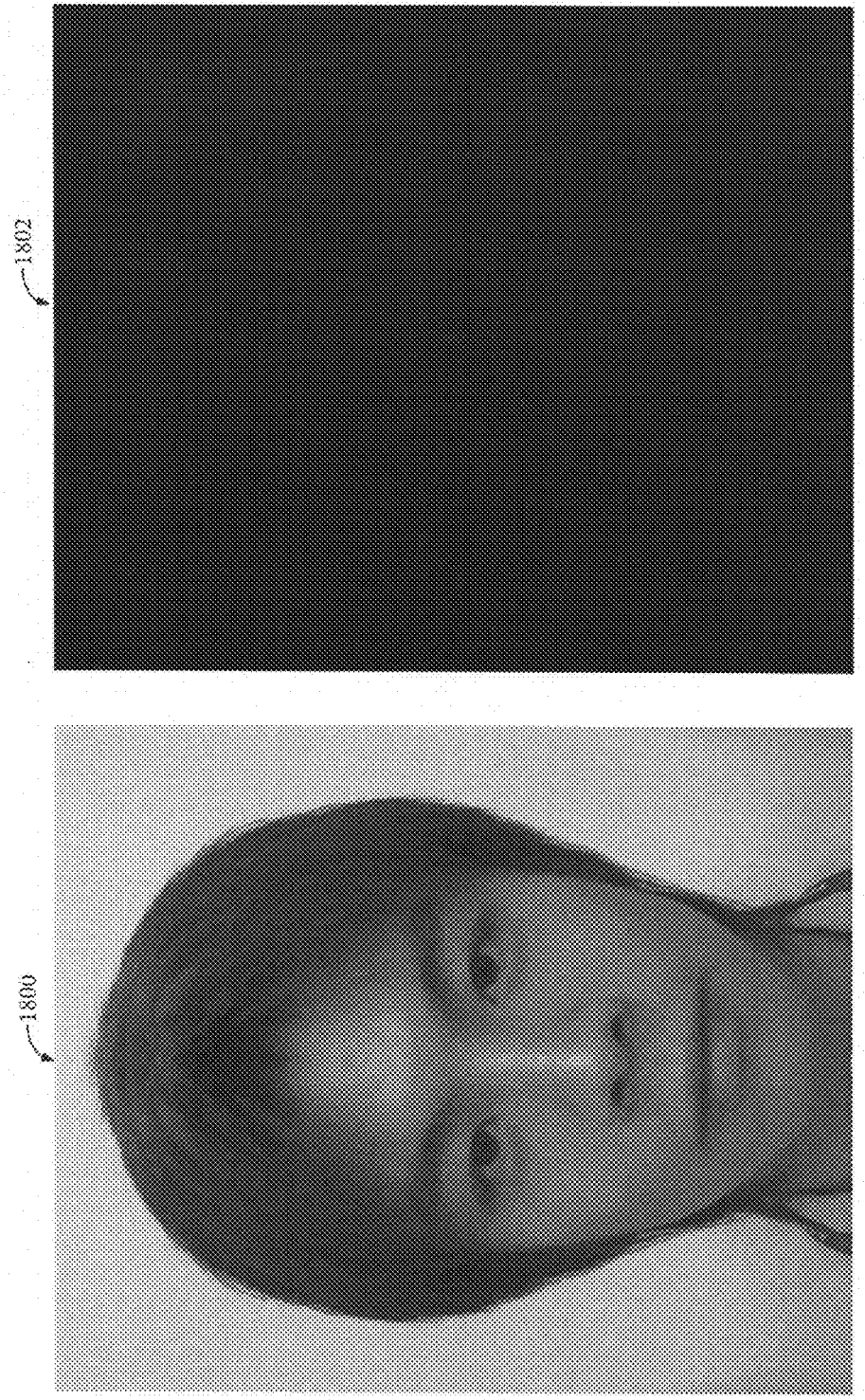
FIG. 18 is a monochromatic input image example and associated skin tone map in accordance with the system for image facial area detection employing skin tones according to one embodiment of the subject application.

It will be understood by those skilled in the art that skin tone masks are not applicable for all images in facial detection. As referenced above, FIG. 18 illustrates one example of an image for which skin tone masks would not be applicable. The input image 1800 of FIG. 18 corresponds to a monochrome image. In such a monochrome image 1800, all pixels are non-skin tone and therefore face detection will be totally blocked for the entire image, i.e. the applied mask of image 1802. The skilled artisan will further appreciate that skin tone masks also should not be applied to near-achromatic images. For example, in the event that a monochrome image is inadvertently saved as an RGB image, or an RGB image with high percentage of low-chromatic pixels. FIG. 19 illustrates such a near-achromatic image 1900, wherein the red, green and blue code values 1902 of a pixel at the forehead are not identical. Application of a suitable skin tone mask, as depicted in the image 1904, is entirely blocked.

It will be appreciated by those skilled in the art that the skin tone model used in accordance with one embodiment of the subject application is capable of being too accurate to fit for some extreme cases of skin tone colors. FIG. 20 illustrates several example illustrations wherein the skin tone model proves too accurate, i.e. a suntanned face of image 2000, a Chinese opera face of image 2002, and faces under tungsten lighting of image 2004.

Figure 22:
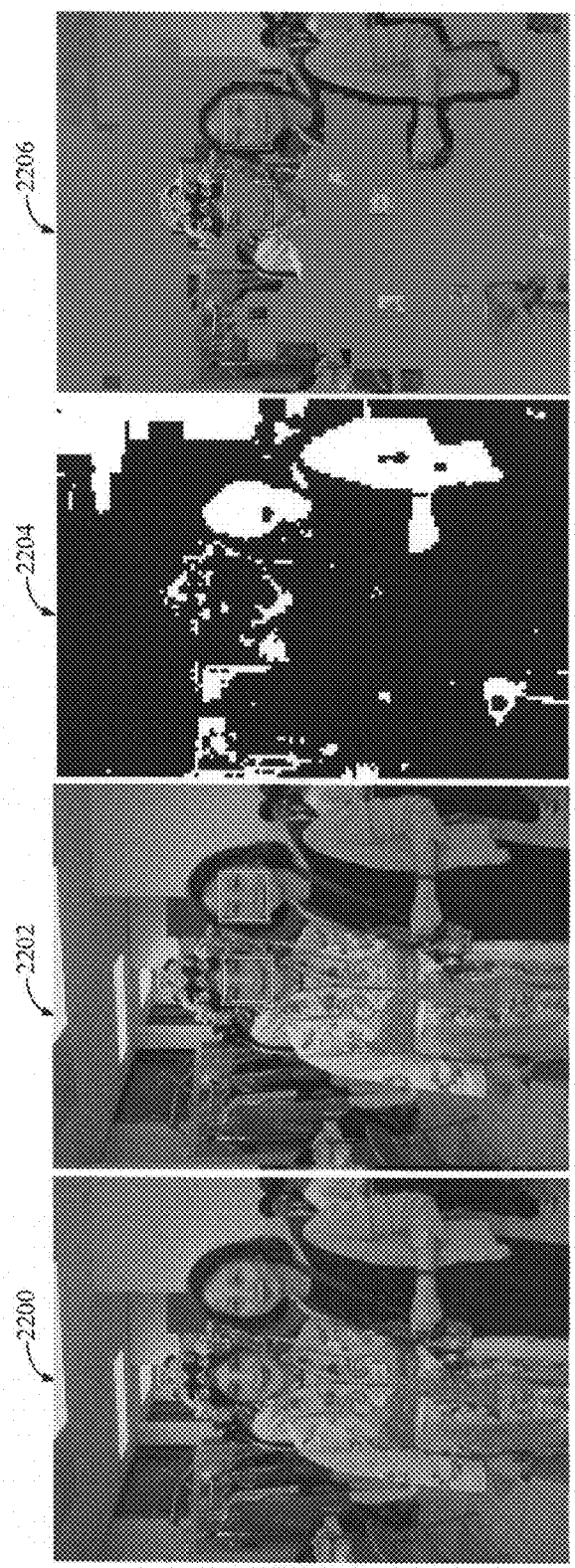
FIG. 22 is another example depicting an input image prior to application of an extended skin tone model in accordance with the system for image facial area detection employing skin tones according to one embodiment of the subject application.
Figure 23:
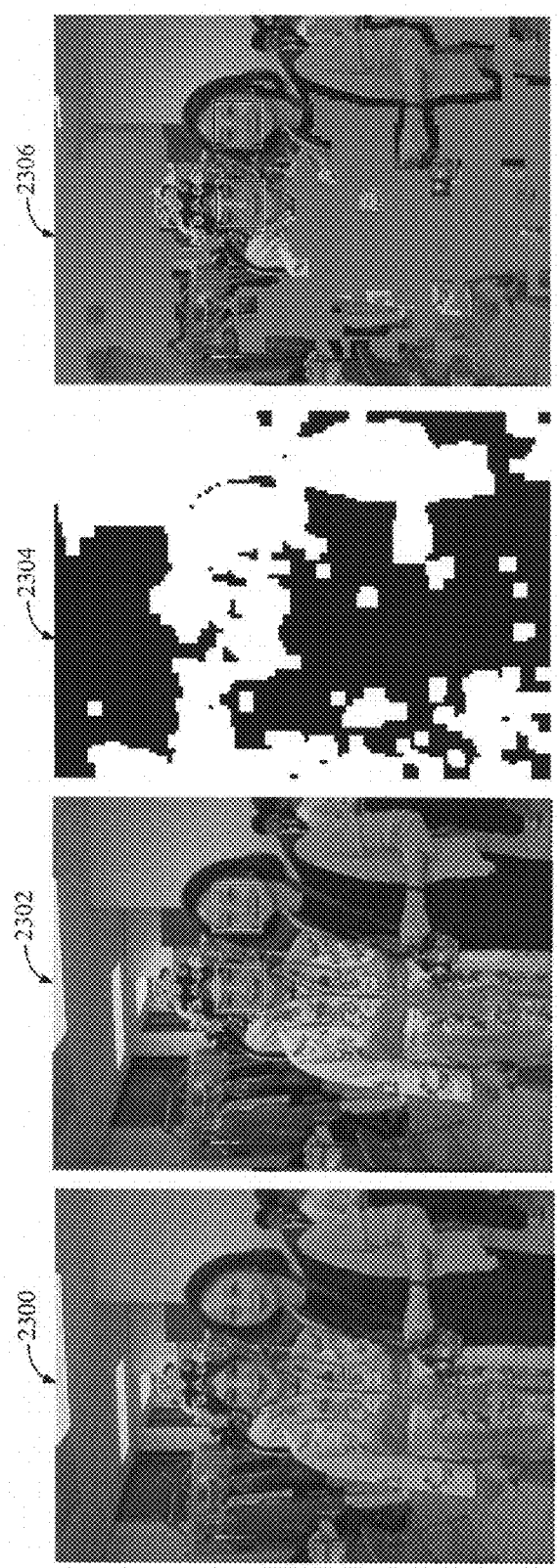
FIG. 23 is an example depicting the input image of FIG. 21 after application of an extended skin tone model in accordance with the system for image facial area detection employing skin tones according to one embodiment of the subject application.

According to one embodiment of the subject application, the radii of the elliptic skin tone model, illustrated in FIG. 21, is capable of being extended to varying degrees so as to accommodate these extreme cases, i.e. the input images of FIG. 20. As shown in FIG. 21, the graph 2100 depicts the skin tone color cluster visualized in L*a*b* space while the image 2102, 2104, and 2106 demonstrate skin tone colors of constant Chroma=35 before and after the elliptic skin tone model is extended, images 2104 and 2106, respectively. The skilled artisan will therefore appreciate that more reddish colors (to accommodate suntanned faces) and more yellowish colors (to accommodate faces under tungsten lighting) are included in the extended skin tone color model 2106. FIG. 22 illustrates an input image of a Chinese opera face prior to implementation of an extended skin tone model. That is, FIG. 22 depicts an input image 2200, facial detection results without mask application 2202, the associated skin tone map 2204, and the skin tone mask 2206 on the input image 2200. FIG. 23 illustrates an example of the same series of images of FIG. 22 with the use of an extended skin tone model. Thus, FIG. 23 includes the input image 2300, facial detection results without mask application 2302, the associated skin tone map 2304 using the extended model, and the skin tone mask 2306 on the input image 2400.

According to a further embodiment of the subject application, speed performance is accomplished via profiling analyses using Microsoft C++ 6.0. FIG. 24 shows an excerpt 2400 of profile analysis running face detection for the input image in FIG. 12 without the skin tone mask. Similarly, FIG. 25 shows the excerpt 2500 of profile analysis running face detection for the input image in FIG. 12 with the skin tone mask. It will be appreciated by those skilled in the art that instead of comparing the total elapsed time, a more consistent measurement is obtained via a comparison of the number of actual classifications and the function call tfdClassifierClassify( ). The skilled artisan will appreciate that such a measurement is suitably independent from overheads such as image file input/output, and universal across different computer systems at different running times. The total number of classifications is 499007 without skin tone mask (shown in the excerpt 2400 of FIG. 24), and it is reduced down to 71250, a 7× speed up, with skin tone mask (shown in the excerpt 2500 of FIG. 25). As shown in FIG. 25, the additional computational cost, the function call SkinToneMask( ), to achieve this 7× speed up is a mere 1.4%.

Figure 26:
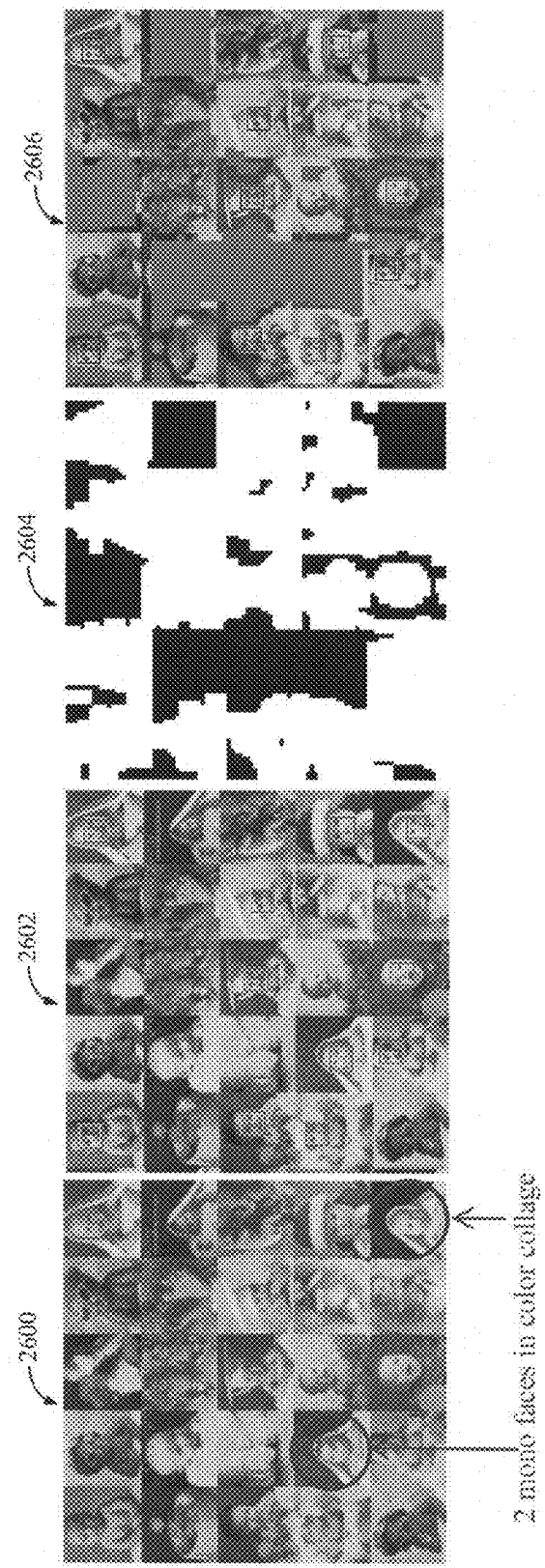
FIG. 26 is an example of monochrome faces lost with skin tone mask in accordance with the system for image facial area detection employing skin tones according to one embodiment of the subject application.

According to one example embodiment of the subject application, testing is conducted for accuracy performance over a face database of 500 images with 711 faces covering faces of all age, gender, ethnic groups, lighting conditions, sizes and brightness, etc. with and without skin tone masks. The results of such testing illustrated that with skin tone masks, there are only 7 faces less in face detection, among them 4 are false positives and 3 are monochrome faces in color images. FIG. 26 illustrates a collage as an input image that includes one or more monochromatic images, which will be lost in application of skin tone masks. That is, FIG. 26 depicts an input collage image 2600 of multiple images, facial detection results without mask application 2602, the associated skin tone map 2604, and the skin tone mask 2606 on the input image 2600, wherein one or more monochromatic images are lost.

Figure 27:
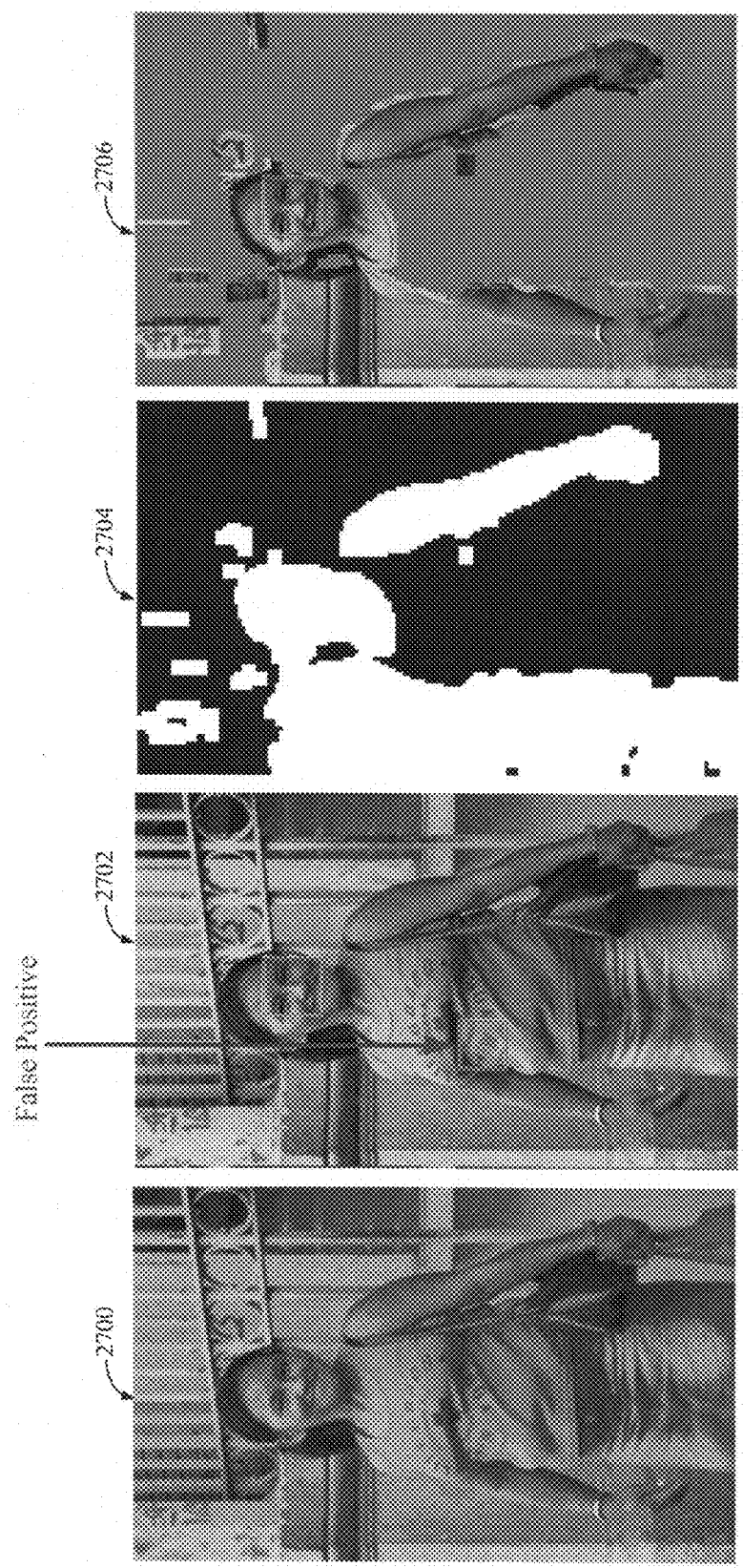
FIG. 27 is an example of a false positive removed with skin tone mask in accordance with the system for image facial area detection employing skin tones according to one embodiment of the subject application.

In accordance with a further example embodiment of the subject application, there is shown in FIG. 27, an input image 2700, the facial detection results 2702 of which include a false positive that the skin tone mask will mask. It will be appreciated by those skilled in the art that the application of skin tone map 2704 and corresponding skin tone mask 2706 is capable of actively reducing false positives. Those skilled in the art will appreciate that with 3 losses and 4 gains, the accuracy with skin tone masks is roughly equivalent to the accuracy resulting without skin tone masks.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system of facial area image detection employing skin tones comprising:
   an input operable to receive image data comprised of a plurality of pixels encoded in at least a three dimensional component space;
   an image sampler operable to generate sub-sampled image data from the received image data;

a pixel calculator operable to calculate a percentage of pixels in the generated sub-sampled image data having an associated chroma value less than a predetermined threshold value;

a comparator operable to compare the calculated percentage of pixels against a predetermined percentage threshold value;

a skin tone classifier operable to classify each pixel in the sub-sample image data in accordance with an associated skin tone model;

a processor operable to generate skin tone map data in accordance with an output of the skin tone classifier; and an output of skin tone mask data in accordance with the generated skin tone map data.

2. The system of claim 1, wherein the skin tone model is an extended elliptic skin tone model.

3. The system of claim 2, further comprising a dilator operable to dilate the generated skin tone map data so as to output the skin tone mask data.

4. The system of claim 3, further comprising a converter operable to convert the received image data to LCH format from input image data encoded in at least one of RGB, CMY, and CMYK format, such that the C value of the LCH format represents the associated chroma value used in the step of calculating.

5. The system of claim 4, wherein the pixel calculator is further operable to selectively bypass the skin tone classifier, the skin tone map processor, and skin tone mask data output in accordance when more than 80 percent of the pixels of the associated image data have a low chroma value corresponding to the predetermined threshold value.

6. The system of claim 4, further comprising:

an applicator operable to selectively apply the skin tone mask data to the received image data so as to generate masked image data; and an output of facial area identification data specifying facial regions in the received image data.

7. A method of facial area image detection employing skin tones comprising the steps of:

receiving image data comprised of a plurality of pixels encoded in at least a three dimensional component space;

generating sub-sampled image data from the received image data;

calculating a percentage of pixels in the generated sub-sampled image data having an associated chroma value less than a predetermined threshold value;

testing the calculated percentage of pixels against a predetermined percentage threshold value;

classifying each pixel in the sub-sample image data in accordance with an associated skin tone model;

generating skin tone map data in accordance with an output of the pixel classification;

outputting skin tone mask data in accordance with the generated skin tone map data.

8. The method of claim 7, wherein the skin tone model is an extended elliptic skin tone model.

9. The method of claim 8, further comprising the step of dilating the generated skin tone map data so as to output the skin tone mask data.

10. The method of claim 9, further comprising the step of converting the received image data to LCH format from input image data encoded in at least one of RGB, CMY, and CMYK format, such that the C value of the LCH format represents the associated chroma value used in the step of calculating.

11. The method of claim 10, further comprising the step of selectively bypassing the steps of classifying, skin tone map generating, and skin tone mask outputting in accordance with a result of the testing indicating more than 80 percent of the pixels of the associated image data have a low chroma value corresponding to the predetermined threshold value.

12. The method of claim 10, further comprising the steps of:

selectively applying the skin tone mask data to the received image data so as to generate masked image data; and outputting facial area identification data specifying facial regions in the received image data in accordance with the masked image data.

13. A system of facial area image detection employing skin tones comprising:

means adapted for receiving image data comprised of a plurality of pixels encoded in at least a three dimensional component space;

means adapted for generating sub-sampled image data from the received image data;

means adapted for calculating a percentage of pixels in the generated sub-sampled image data having an associated chroma value less than a predetermined threshold value;

means adapted for testing the calculated percentage of pixels against a predetermined percentage threshold value;

classification means adapted for classifying each pixel in the sub-sample image data in accordance with an associated skin tone model;

means adapted for generating skin tone map data in accordance with an output of the pixel classification;

output means adapted for outputting skin tone mask data in accordance with the generated skin tone map data.

14. The system of claim 13, wherein the skin tone model is an extended elliptic skin tone model.

15. The system of claim 14, further comprising means adapted for dilating the generated skin tone map data so as to output the skin tone mask data.

16. The system of claim 15, further comprising conversion means adapted for converting the received image data to LCH format from input image data encoded in at least one of RGB, CMY, and CMYK format, such that the C value of the LCH format represents the associated chroma value used in the step of calculating.

17. The system of claim 16, further comprising means adapted for selectively bypassing the classification means, skin tone map generating means, and output means in accordance with an output of the testing means indicating more than 80 percent of the pixels of the associated image data have a low chroma value corresponding to the predetermined threshold value.

18. The system of claim 16, further comprising:

application means adapted for selectively applying the skin tone mask data to the received image data so as to generate masked image data; and output means adapted for outputting facial area identification data specifying facial regions in the received image data in accordance with the generated masked image data.

* * * * *